US012522128B2

(12) United States Patent
Kogure et al.

(10) Patent No.: US 12,522,128 B2
(45) Date of Patent: Jan. 13, 2026

(54) VEHICLE LAMP

(71) Applicant: Stanley Electric Co., Ltd., Tokyo (JP)

(72) Inventors: Shinya Kogure, Tokyo (JP); Ko Horii, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/847,083

(22) PCT Filed: Mar. 9, 2023

(86) PCT No.: PCT/JP2023/008999
§ 371 (c)(1),
(2) Date: Sep. 13, 2024

(87) PCT Pub. No.: WO2023/176671
PCT Pub. Date: Sep. 21, 2023

(65) Prior Publication Data
US 2025/0222855 A1 Jul. 10, 2025

(30) Foreign Application Priority Data
Mar. 14, 2022 (JP) .................. 2022-039348

(51) Int. Cl.
B60Q 1/14 (2006.01)
F21S 41/147 (2018.01)
(Continued)

(52) U.S. Cl.
CPC .......... B60Q 1/1407 (2013.01); F21S 41/147 (2018.01); F21S 41/151 (2018.01);
(Continued)

(58) Field of Classification Search
CPC ........ F21S 41/25; F21S 41/663; F21S 41/147; F21S 41/322; F21S 41/43; F21S 41/151; F21S 41/323; B60Q 1/1407
See application file for complete search history.

(56) References Cited

U.S. PATENT DOCUMENTS 9,255,683 B2 * 2/2016 Brendle ................ F21S 41/255
10,082,272 B2 * 9/2018 Gromfeld ............. F21S 41/265
(Continued)

FOREIGN PATENT DOCUMENTS

| JP | 2019-220404 A1 | 12/2019 |
| JP | 2021-111446 A | 8/2021 |
| JP | 2022-517606 A | 3/2022 |

OTHER PUBLICATIONS

International Search Report and Written Opinion for PCT/JP2023/008999 dated May 9, 2023.

Primary Examiner — Matthew J. Peerce
(74) Attorney, Agent, or Firm — Kenealy Vaidya LLP

(57) ABSTRACT

The vehicle lamp can include: a projection lens; an upper separator disposed behind the projection lens and above the optical axis of the projection lens; a lower separator disposed behind the projection lens and below the optical axis of the projection lens; a low beam light source; and a high beam light source; the upper separator includes a low beam light incident portion and a low beam exit surface; the lower separator includes a high beam light incident portion and a high beam exit surface; the focal point of the projection lens is positioned between the low beam exit surface and the high beam exit surface; the optical length of the upper separator is longer than that of the lower separator.

9 Claims, 17 Drawing Sheets

(51) Int. Cl.
*F21S 41/151* (2018.01)
*F21S 41/25* (2018.01)
*F21S 41/32* (2018.01)
*F21S 41/43* (2018.01)
*F21S 41/663* (2018.01)
*F21W 102/135* (2018.01)

(52) U.S. Cl.
CPC ............. *F21S 41/25* (2018.01); *F21S 41/322* (2018.01); *F21S 41/43* (2018.01); *F21S 41/663* (2018.01); *F21W 2102/135* (2018.01)

(56) References Cited

U.S. PATENT DOCUMENTS

| | | | |
|---|---|---|---|
| 11,994,267 B2 * | 5/2024 | Mochizuki | F21S 41/32 |
| 12,013,093 B2 * | 6/2024 | Muramatsu | F21S 41/27 |
| 2022/0065416 A1 * | 3/2022 | Qiu | F21V 17/10 |

\* cited by examiner

VEHICLE LAMP

This application is a U.S. National Stage Application under 35 U.S.C § 371 of International Patent Application No. PCT/JP2023/008999 filed Mar. 9, 2023, which claims the benefit of priority under 35 U.S.C. § 119 to Japanese Patent Application No. 2022-039348 filed Mar. 14, 2022, the disclosures of all of which are hereby incorporated by reference in their entireties.

TECHNICAL FIELD

The present disclosure relates to a vehicle lamp, and in particular to a vehicle lamp in which a partial light distribution pattern for a high beam does not spread in the horizontal direction even if the number of light sources for a low beam is reduced, and the luminous intensity required for a partial light distribution pattern for a high beam can be satisfied.

BACKGROUND ART

A vehicle lamp has been proposed which is provided with a projection lens, a separator disposed behind the projection lens, and a substrate on which light sources for low beams and light sources for high beams are mounted disposed behind the separator (For example, see Patent Literature 1).

In the vehicle lamp disclosed in Patent Literature 1, the separator includes a low beam light incident portion disposed on the rear side of the vehicle and a low beam light exit surface disposed on the front side of the vehicle, and a high beam light incident portion disposed on the rear side of the vehicle and a high beam light exit surface disposed on the front side of the vehicle. Light emitted by the light source for low beam enters from a light incident portion for low beam, exits from a light exit surface for low beam, and is projected by a projection lens (the focal point of the projection lens is located between the light exit surface for low beam and the light exit surface for high beam) to form a light distribution pattern for low beam. On the other hand, light emitted by the high beam light source enters from the high beam incident part, exits from the high beam exit surface, and is projected by a projection lens to form a high beam light distribution pattern.

In contrast, the inventors of the present invention considered reducing the number of low beam light sources in the vehicle lamp described in Patent Literature 1 from a cost-saving perspective.

CITATION LIST

Patent Literature

Patent Literature 1: Japanese Unexamined Patent Application Publication No. 2019-220404

SUMMARY OF INVENTION

Technical Problem

However, as a result of examination by the present inventors, it has been found that in the vehicular lighting fixture disclosed in Patent Literature 1, when the number of light sources for low beam is reduced, the area where the partial light distribution patterns for low beam formed by the light from the light sources for low beam overlap each other decreases, and as a result, uneven light distribution occurs in the light distribution patterns for low beam formed by the partial light distribution patterns for low beam.

In contrast, the inventors of the present invention considered extending the optical length of the separator to broaden the partial light distribution pattern for the low beam in the horizontal direction, thereby increasing the overlapping areas of the partial light distribution patterns for the low beam and suppressing the occurrence of light distribution unevenness in the low beam light distribution pattern.

However, when the optical length of the separator is increased, the partial light distribution pattern for high beams formed by light from the light sources for high beams also expands in the horizontal direction. As a result, there is a problem that the light intensity required for the partial light distribution pattern for high beams is insufficient and the ADB function cannot be realized using the partial light distribution pattern for high beams.

The present disclosure is made to solve such problems, and an object of the present disclosure is to provide a vehicle lamp capable of suppressing the occurrence of light distribution unevenness in a light distribution pattern for low beams even if the number of light sources for low beams is reduced, and preventing the partial light distribution pattern for high beams from spreading in the horizontal direction (As a result, the luminous intensity required for the partial light distribution pattern for high beam can be satisfied and ADB functions can be realized).

Solution to Problem

A vehicle lamp according to the present disclosure includes: a projection lens; an upper separator disposed behind the projection lens and above an optical axis of the projection lens; a lower separator disposed behind the projection lens and below the optical axis of the projection lens; a low beam light source; and
a high beam light source; wherein the upper separator includes a low beam light incident portion disposed on the rear side of a vehicle and a low beam light exiting surface disposed on the front side of the vehicle, the lower separator includes a high beam light incident portion disposed on the rear side of the vehicle and a high beam light exiting surface disposed on the front side of the vehicle, the low beam light source emits light which enters from the low beam light incident portion, exits from the low beam light exiting surface, and is projected by the projection lens to form a low beam light distribution pattern, the high beam light source emits light which enters from the high beam light incident portion, exits from the high beam light exiting surface, and is projected by the projection lens to form a high beam light distribution pattern, a focal point of the projection lens is positioned between the low beam light exiting surface and the high beam light exiting surface; an optical length of the upper separator is longer than an optical length of the lower separator.

With such a configuration, it is possible to provide a vehicular lamp capable of suppressing the occurrence of light distribution unevenness in a light distribution pattern for low beams even if the number of light sources for low beams is reduced, and preventing the partial light distribution pattern for high beams from spreading in the horizontal direction (As a result, the luminous intensity required for the partial light distribution pattern for high beam can be satisfied and ADB functions can be realized).

This is because the optical length of the upper separator is longer than that of the lower separator. That is, according to the present embodiment, by making the optical length of the upper separator longer than that of the lower separator, the partial light distribution patterns for low beams can be expanded in the horizontal direction and the regions overlapping each other can be increased. Therefore, even if the number of light sources for low beams is reduced, the occurrence of light distribution unevenness in the light distribution patterns for low beams can be suppressed. Further, according to the present embodiment, since the optical length of the upper separator can be increased without increasing the optical length of the lower separator, even if the optical length of the upper separator is increased longer than that of the lower separator as described above, the partial light distribution patterns for high beams do not spread in the horizontal direction. As a result, even if the number of light sources for low beam is reduced, the luminous intensity required for the partial light distribution pattern for high beam can be satisfied and the ADB function can be realized.

In the above-described vehicle lamp, the vehicle lamp may further include a substrate on which the low beam light source and the high beam light source are mounted; wherein the low beam light incident portion may be disposed on the rear side of the vehicle from the high beam light incident portion, and the substrate may be disposed in an inclined state such that the low beam light source faces the low beam light incident portion, and the high beam light source may face the high beam light incident portion.

In the above-described vehicle lamp, the low beam light incident portion may include a low beam light incident surface and a low beam total reflection surface disposed above the low beam light incident surface, the high beam light incident portion may include a high beam light incident surface, a high beam total reflection surface disposed above the high beam light incident surface, and a pair of side surfaces, a cut-off shape corresponding to a cut-off line of the low beam light distribution pattern may be provided between the low beam light exiting surface and the high beam light exiting surface.

In the above-described vehicle lamp, the low beam total reflection surface may be a total reflection surface for totally reflecting light from the low beam light source which enters from the low beam light incident portion and enters the low beam total reflection surface so as to converge in the vicinity of the focal point of the projection lens; the high beam total reflection surface may be a total reflection surface for totally reflecting light from the high beam light source which enters from the high beam light incident portion and enters the high beam total reflection surface so as to converge in the vicinity of the focal point of the projection lens.

In the above-described vehicle lamp, the low beam total reflection surface may be an elliptical total reflection surface having a first focal point located near the low beam light source and a second focal point located near the focal point of the projection lens; the high beam total reflection surface may be a curved total reflection surface.

In the above-described vehicle lamp, in a horizontal section, a central portion of the low beam light exiting surface and a central portion of the high beam light exiting surface may be along the focal plane of the projection lens, and portions on both sides of the central portion of the low beam light exiting surface and portions on both sides of the central portion of the high beam light exiting surface may be separated from the focal plane of the projection lens toward the rear side of the vehicle.

In the above-described vehicle lamp, in a vertical section, the low beam light exiting surface may extend upward from a lower end portion of the low beam light exiting surface through an inclined portion inclined toward the front of the vehicle, and the high beam light exiting surface may extend downward from an upper end portion of the high beam light exiting surface high beam through an inclined portion inclined toward the front of the vehicle.

In the above-described vehicle lamp, the vehicle lamp further may include a light shielding member disposed between the upper separator and the lower separator.

Advantageous Effects of Invention

According to the present disclosure, it is possible to provide a vehicle lamp capable of suppressing the occurrence of light distribution unevenness in a light distribution pattern for low beams even if the number of light sources for low beams is reduced, and preventing the partial light distribution pattern for high beams from spreading in the horizontal direction (As a result, the luminous intensity required for the partial light distribution pattern for high beam can be satisfied and ADB functions can be realized).

DESCRIPTION OF EMBODIMENTS

Figure 1:
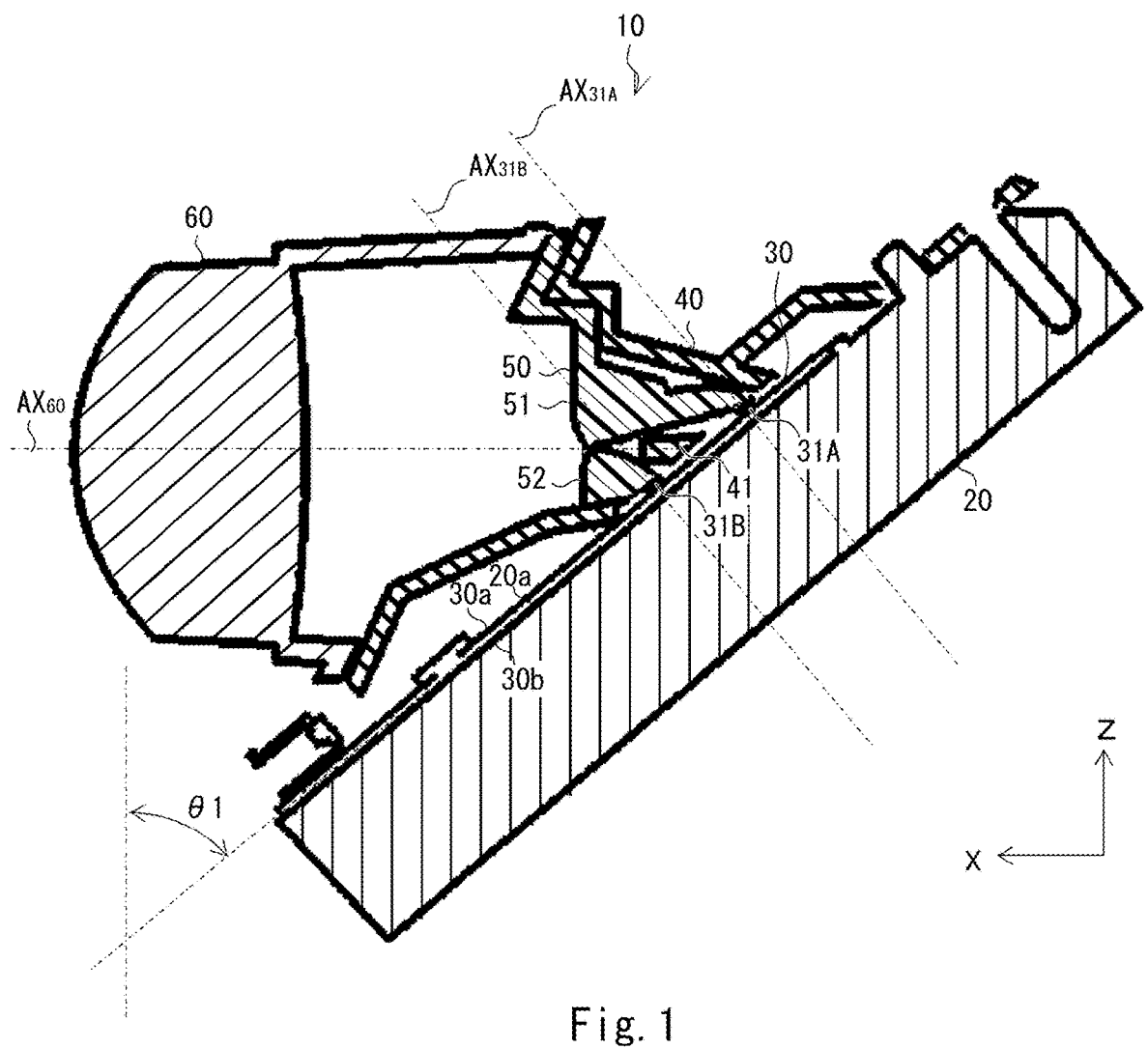
FIG. 1 is a longitudinal sectional view of the vehicle lamp 10 taken along a vertical plane including the optical axis AX60 (reference axis) of the projection lens 60.

A vehicle lamp 10 according to a first embodiment of the present disclosure is described below with reference to accompanying drawings. In the drawings, corresponding components are denoted by the same reference numerals, and repetitive description is omitted.

FIG. 1 is a longitudinal sectional view of the vehicle lamp 10 taken along a vertical plane including the optical axis $AX_{60}$ (reference axis) of the projection lens 60.

The vehicle lamp 10 of the present embodiment is a vehicular headlamp functioning as a low beam headlamp or a high beam headlamp, and is mounted on both right and left sides of a front end portion of a vehicle (not shown) such as an automobile. The vehicle lamp 10 mounted on both right and left sides are configured symmetrically to each other. Therefore, in the following, the vehicle lamp 10 mounted on the right side (right side in direction toward front side of vehicle) at the front end part of the vehicle V is described as a representative.

As shown in FIG. 1, the vehicle lamp 10 includes a heat sink 20, a substrate 30 on which a low beam light source 31A and a high beam light source 31B are mounted, a holder 40, a separator 50, and a projection lens 60. For convenience of explanation, the XYZ axes are defined below. The X axis extends in a vehicle front-rear direction. The Y axis extends in a vehicle width direction. The Z axis extends in a vertical direction.

The heat sink 20 includes a substrate fixing surface 20a to which the substrate 30 is fixed. The substrate fixing surface 20a is inclined at an angle θ1 with respect to the Z axis. The angle θ1 is, for example, 50°. As the material of the heat sink 20, metals such as aluminum and copper having high thermal conductivity, alloys of these metals, and alloys such as magnesium having low specific gravity are used. The heat sink 20 is manufactured by a manufacturing method such as cutting, extrusion, insertion, brazing or die casting.

Figure 2:
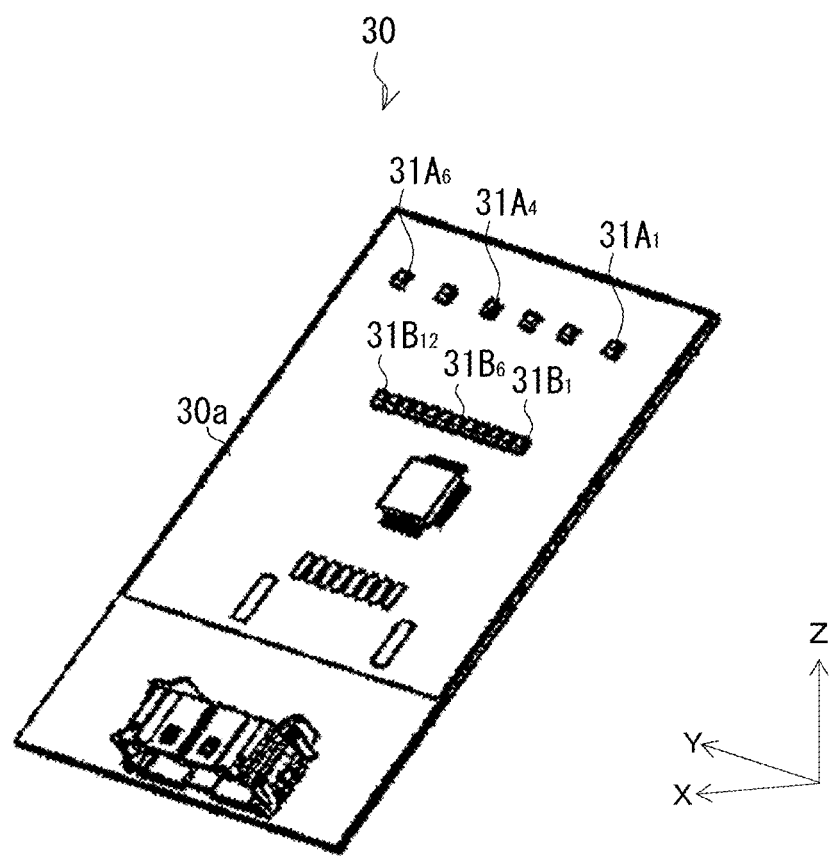
FIG. 2 is a perspective view of the substrate 30.

FIG. 2 is a perspective view of the substrate 30.

The substrate 30 is a metal substrate such as aluminum, and includes a light source mounting surface 30a on which low beam light sources $31A_1$~$31A_6$ and high beam light sources $31B_1$~$31B_{12}$ are mounted, and a back surface 30b on the opposite side thereof. Hereinafter, when the low beam light sources $31A_1$~$31A_6$ and the high beam light sources $31B_1$~$31B_{12}$ are not particularly distinguished, they are referred to as the low beam light source 31A and the high beam light source 31B.

The low beam light source 31A and the high beam light source 31B are semiconductor light emitting elements such as LEDs. As shown in FIG. 2, in the present embodiment, six low beam light sources $31A_1$~$31A_6$ are mounted on an upper stage of the substrate 30 (light source mounting surface 30a) in a state disposed in a line in the Y-axis direction at intervals from each other. Twelve high beam light sources $31B_1$~$31B_{12}$ are mounted on a lower stage of the substrate 30 (light source mounting surface 30a) in a state disposed in a line in the Y-axis direction at intervals from each other.

The low beam light source 31A and the high beam light source 31B are provided with a light emitting surface. The light emitting surface is, for example, a rectangular light emitting surface of 1 mm square. The low beam light source 31A and the high beam light source 31B are mounted on the substrate 30 (light source mounting surface 30a) in a state where their emitting surfaces are parallel to the light source mounting surface 30a. An optical axis $AX_{31A}$ (See FIG. 1 and FIG. 3) of the low beam light source 31A passes through the center of the light emitting surface and extends in a direction orthogonal to the light emitting surface. Similarly, an optical axis $AX_{31B}$ (See FIG. 1 and FIG. 3) of the high beam light source 31B passes through the center of the light emitting surface and extends in a direction orthogonal to the light emitting surface.

The substrate 30 is fixed (for example, fixed by a screw) to the heat sink 20 (substrate fixing surface 20a) in a state inclined at an angle θ1 (see FIG. 1) with respect to the Z axis. Specifically, by the contact of the back surface 30b on the opposite side of the light source mounting surface 30a with the substrate fixing surface 20a of the heat sink 20, the substrate 30 is fixed to the heat sink 20 (substrate fixing surface 20a) in a state inclined at an angle θ1 with respect to the Z axis. A TIM (thermal interface material) such as thermal grease, a thermally conductive sheet, and a thermally conductive adhesive is provided between the heat sink 20 (substrate fixing surface 20a) and the substrate 30 (back surface 30b) in order to improve the adhesion between them and to reduce the contact thermal resistance.

Figure 3:
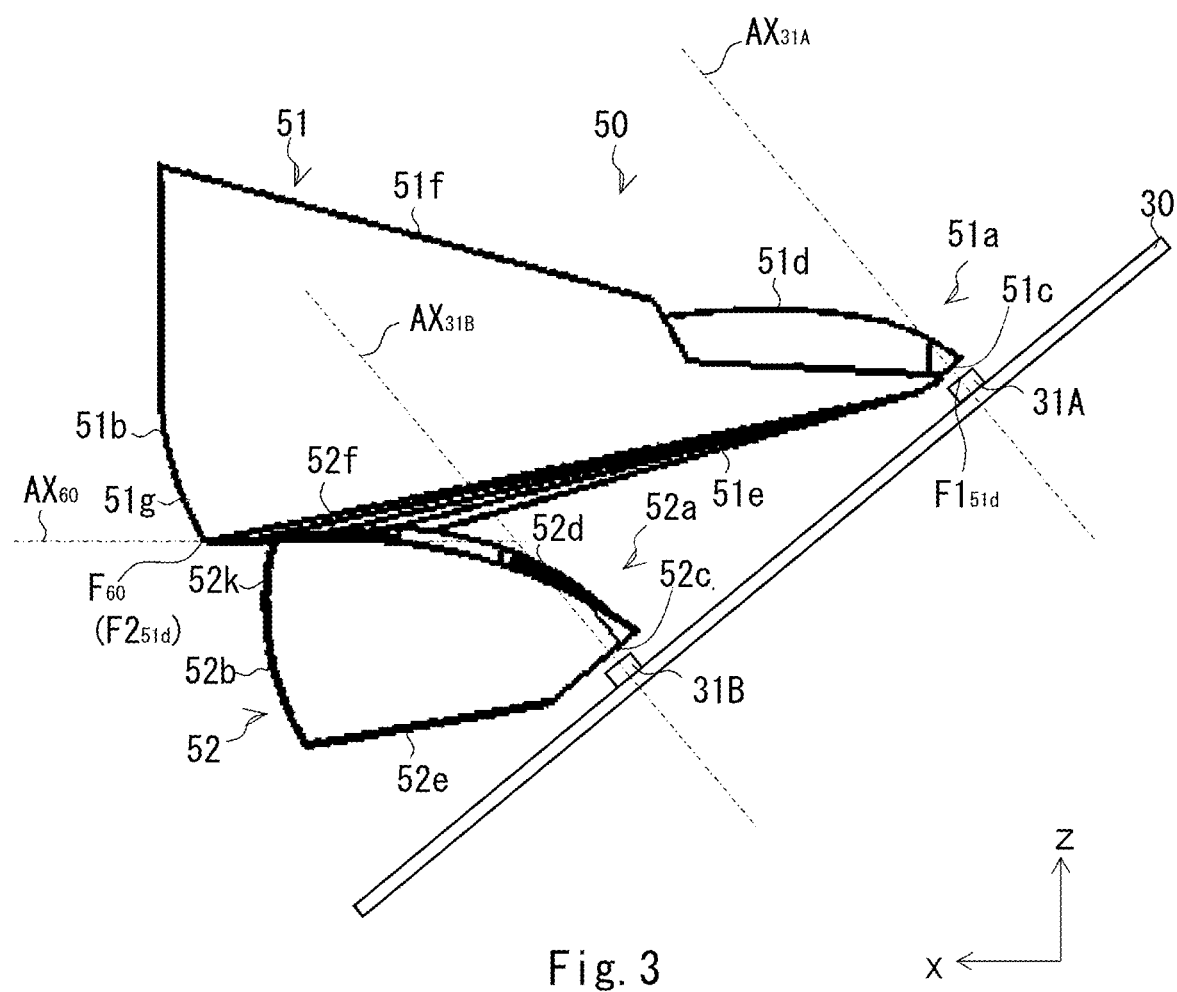
FIG. 3 is a side view of the substrate 30 and the separator 50.
Figure 4:
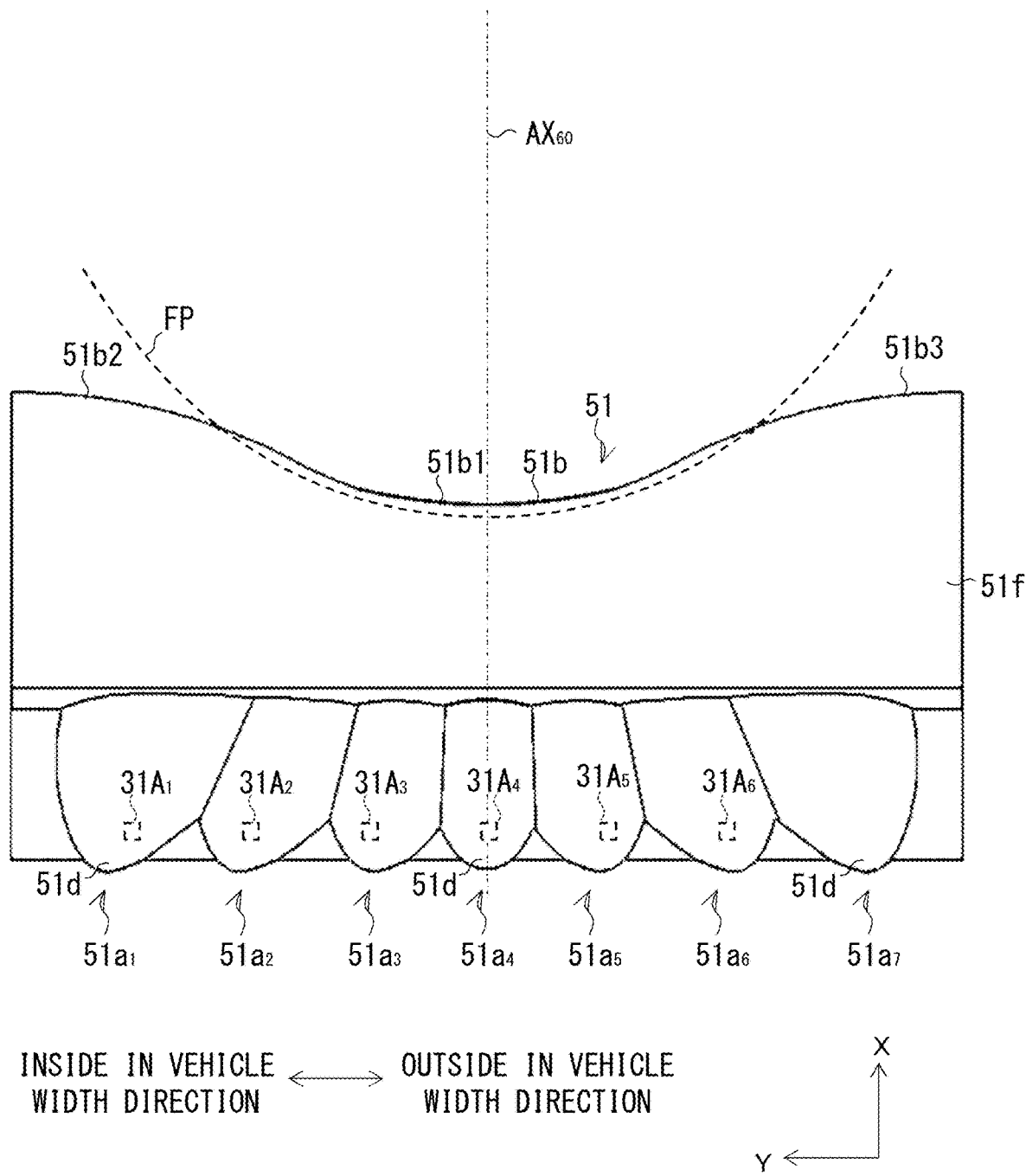
FIG. 4 is a top view of the separator 50.

FIG. 3 is a side view of the substrate 30 and the separator 50. FIG. 4 is a top view of the separator 50.

The separator 50 is made of silicon resin and includes an upper separator 51 and a lower separator 52 as shown in FIG. 3. Furthermore, the separator 50 can be made from any heat-resistant material and is not limited to silicone resin. For example, the separator 50 may be made of glass.

The upper separator 51 is disposed above the optical axis $AX_{60}$ of the projection lens 60. On the other hand, the lower separator 52 is disposed below the optical axis $AX_{60}$ of the projection lens 60. The optical axis $AX_{60}$ of the projection lens 60 extends in the X-axis direction. As shown in FIG. 4, the separator 50 is configured symmetrically with respect to the optical axis $AX_{60}$ of the projection lens 60 in a top view.

The upper separator 51 and the lower separator 52 are integrally molded in a state where the lower end of the low beam light exiting surface 51b of the upper separator 51 and the upper end of the high beam light exiting surface 52b of the lower separator 52 are connected (see FIG. 3). The upper separator 51 and the lower separator 52 may be molded separately.

By fixing the holder 40 holding the separator 50 to the heat sink 20 (see FIG. 1), the separator 50 is disposed in front of the substrate 30 in a state where the low beam light incident portion 51a (low beam light incident surface 51c) and the high beam light incident portion 52a (high beam light incident surface 52c) face the low beam light source 31A and the high beam light source 31B (see FIG. 3).

The holder 40 includes a light-shielding portion 41 (see FIG. 1). The light-shielding portion 41 is disposed between the upper separator 51 and the lower separator 52 so that light from the low beam light source 31A entering the upper separator 51 does not leak out and enter the lower separator 52, and light from the high beam light source 31B entering the lower separator 52 does not leak out and enter the upper separator 51.

The projection lens 60 is an aspherical lens. The projection lens 60 is disposed in front of the separator 50 by fixing the projection lens to the heat sink 20 or the like with the projection lens 60 positioned with respect to the separator 50. A focal point $F_{60}$ (See FIG. 3 and FIG. 5.) of the projection lens 60 is positioned between a lower end portion of the low beam light exiting surface 51b of the upper separator 51 and an upper end portion of the high beam light exiting surface 52b of the lower separator 52 (cut-off shape 51g).

Figure 5:
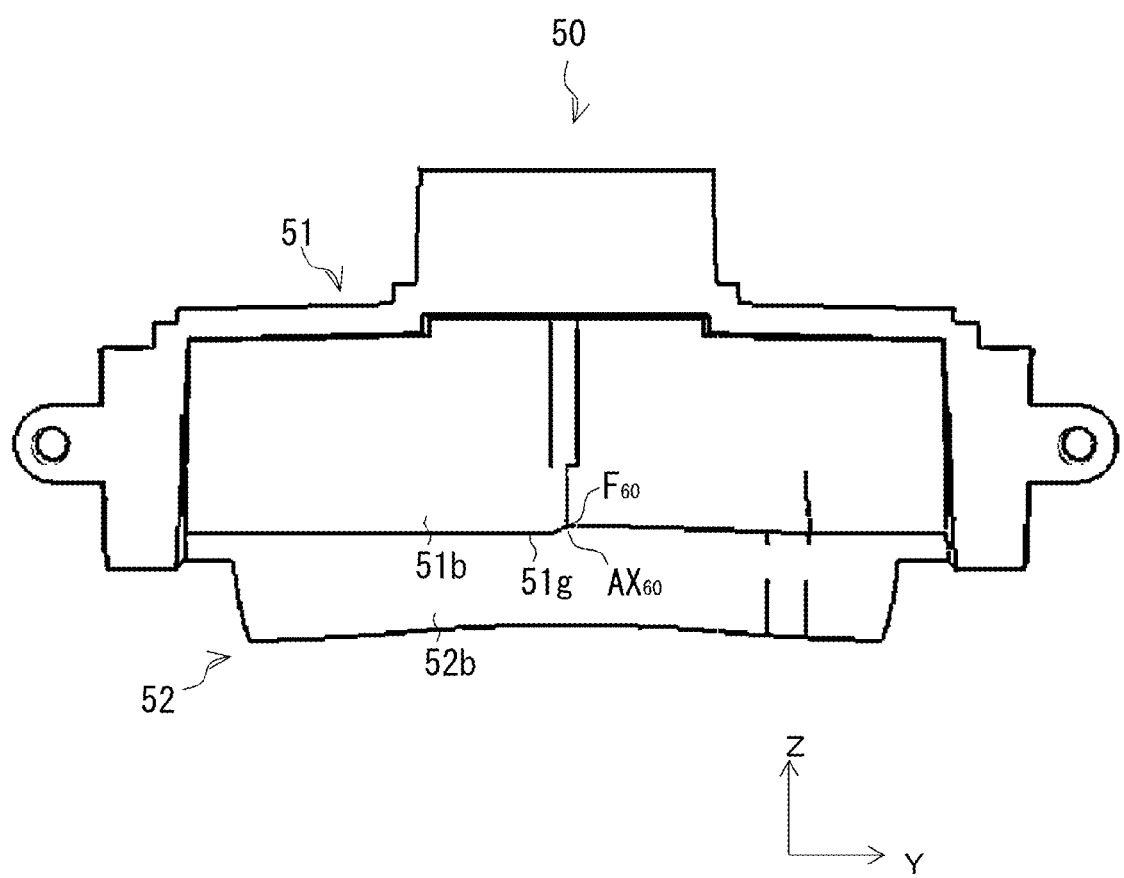
FIG. 5 is a front view of the separator 50.

FIG. 5 is a front view of the separator 50.

As shown in FIG. 5, a cut-off shape 51g (Z-shaped stepped portion) corresponding to the cut-off line of the low beam light distribution pattern $P_{Lo}$ is provided between the lower end portion of the low beam light exiting surface 51b of the upper separator 51 and the upper end portion of the high beam light exiting surface 52b of the lower separator 52. The optical length (the optical distance at which the light from the low beam light source 31A passes through the upper separator 51) of the upper separator 51 is longer than the optical length (the optical distance at which the light from the high beam light source 31B passes through the lower separator 52) of the lower separator 52 (see FIG. 3).

First, the upper separator 51 will be described.

Figure 6:
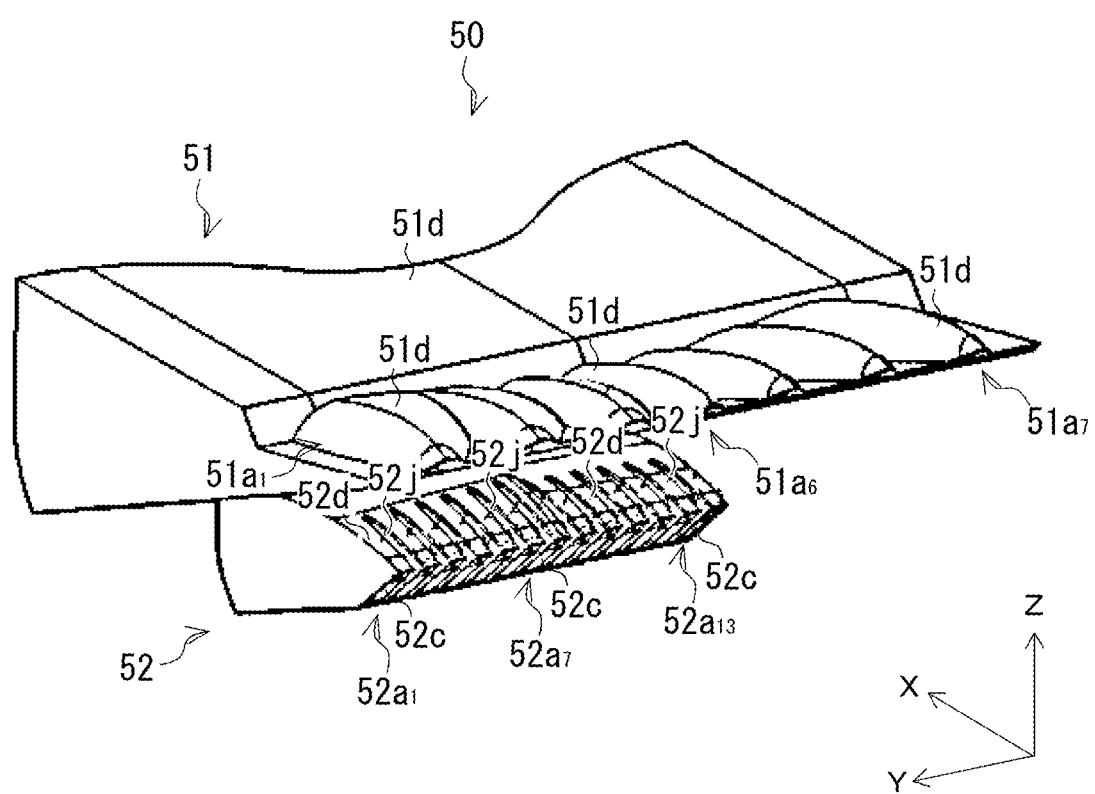
FIG. 6 is a perspective view of the separator 50.

FIG. 6 is a perspective view of the separator 50.

The upper separator 51 includes a low beam light incident portion 51a ($51a_1$ to $51a_7$) disposed on the vehicle rear side, as shown in FIGS. 3, 4, and 6, and a low beam light exiting surface 51b disposed on the vehicle front side (see FIG. 3). Hereinafter, when the low beam light incident portion $51a_1$~$51a_7$ are not particularly distinguished, they are referred to as the low beam light incident portion 51a.

The low beam light incident portions $51a_1$~$51a_7$ are disposed in a line in the Y-axis direction. In the vehicle lamp 10 mounted on the right side of the front end of the vehicle (the right side toward the front of the vehicle) as in this embodiment, as shown in FIG. 4, the low beam light sources $31A_1$ to $31A_6$ are disposed in a state where the low beam light incident portions $51a_1$ to $51a_6$ face them. The dotted rectangle in FIG. 4 represents the low beam light source $31A_1$~$31A_6$ visible through the upper separator 51 (the low beam light incident portions $51a_1$~$51a_6$).

On the other hand, although not shown, in the vehicle lamp 10 mounted on the left side of the front end of the vehicle (the left side toward the front of the vehicle), the low beam light sources $31A_1$ to $31A_6$ are disposed in a state where they face the low beam light incident portions $51a_2$ to $51a_7$ instead of $51a_1$ to $51a_6$.

As described above, the number of the low beam light incident portions $51a_1$~$51a_7$ is larger than the number of the low beam light sources $31A_1$~$31A_6$, and the separator 50 is configured symmetrically with respect to the optical axis $AX_{60}$ of the projection lens 60 in the top view (see FIG. 4). Thus, the separator 50 (upper separator 51) can be used as both the vehicle lamp 10 mounted on the right side (on the right side toward the front of the vehicle) of the front end portion of the vehicle and the vehicle lamp 10 mounted on the left side (on the left side toward the front of the vehicle) of the front end portion of the vehicle.

As shown in FIG. 3, the low beam light incident portion 51a includes a low beam light incident surface 51c facing the low beam light source 31A (light emitting surface) and a low beam total reflection surface 51d disposed above the low beam light incident surface 51c.

The low beam light incident surface 51c is, for example, a plane parallel to the light emitting surface of the low beam light source 31A. The distance between the low beam light source 31A (light emitting surface) and the low beam light incident surface 51c is about 2 mm. The low beam light source 31A is disposed close to the low beam light incident surface 51c.

The low beam total reflection surface 51d is a total reflection surface that totally reflects light from the low beam light source 31A, which enters from the low beam light incident surface 51c and enters the low beam total reflection surface 51d, so as to converge near the focal point $F_{60}$ of the projection lens 60. In this embodiment, the low beam total reflection surface 51d is an elliptical total reflection surface having a first focal point $F1_{51d}$ (see FIG. 3) positioned near the low beam light source 31A and a second focal point $F2_{51d}$ (see FIG. 3) positioned near the focal point $F_{60}$ of the projection lens 60.

Figure 7A:
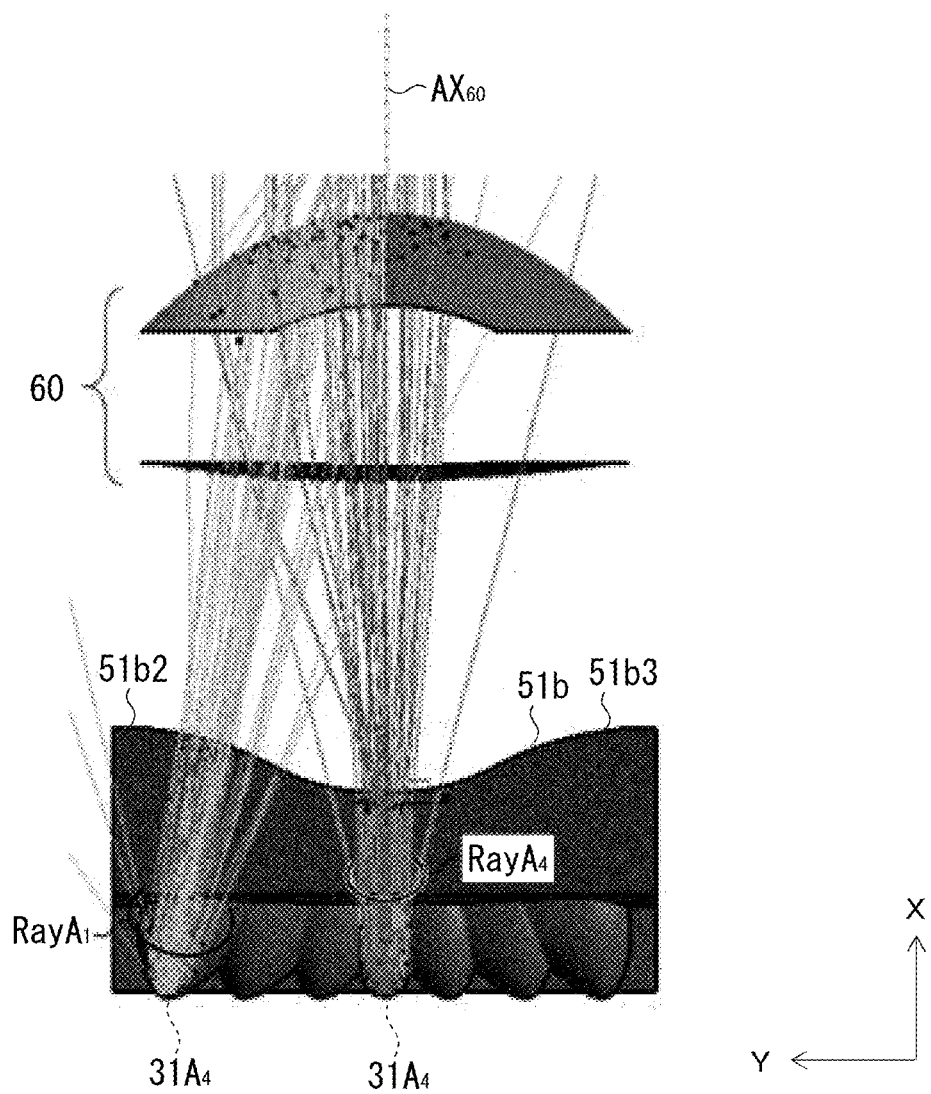
FIG. 7A is a top view showing the optical paths of the light Ray $A_4$ emitted by the low beam light source $31A_4$ and the light Ray$A_1$ emitted by the low beam light source $31A_1$.

As shown in FIG. 4, in the top view (also in the horizontal section), the central portion $51b_1$ of the low beam light exiting surface 51b is along the focal plane FP of the projection lens 60. On the other hand, portions $51b_2$ and $51b_3$ on both sides of the central portion $51b_1$ of the low beam light exiting surface 51b are separated from the focal plane FP of the projection lens 60 toward the rear side of the vehicle. As a result, as shown in FIG. 7A, the angle of incidence of light (e.g., see Ray A1 in FIG. 7A) entering the portions $51b_2$ and $51b_3$ on both sides of the central portion $51b_1$ of the low beam light exiting surface 51b becomes smaller. Thus, the occurrence of Fresnel reflection (Fresnel loss) or total reflection is suppressed in the portions $51b_2$ and $51b_3$ on both sides of the central portion $51b_1$ of the low beam light exiting surface 51b. Therefore, light can be efficiently extracted also in the portions $51b_2$ and $51b_3$ on both sides of the central portion $51b_1$ of the low beam light exiting surface 51b. FIG. 7A is a top view showing the optical paths of the light Ray $A_4$ emitted by the low beam light source $31A_4$ and the light Ray $A_1$ emitted by the low beam light source $31A_1$.

Figure 7B:
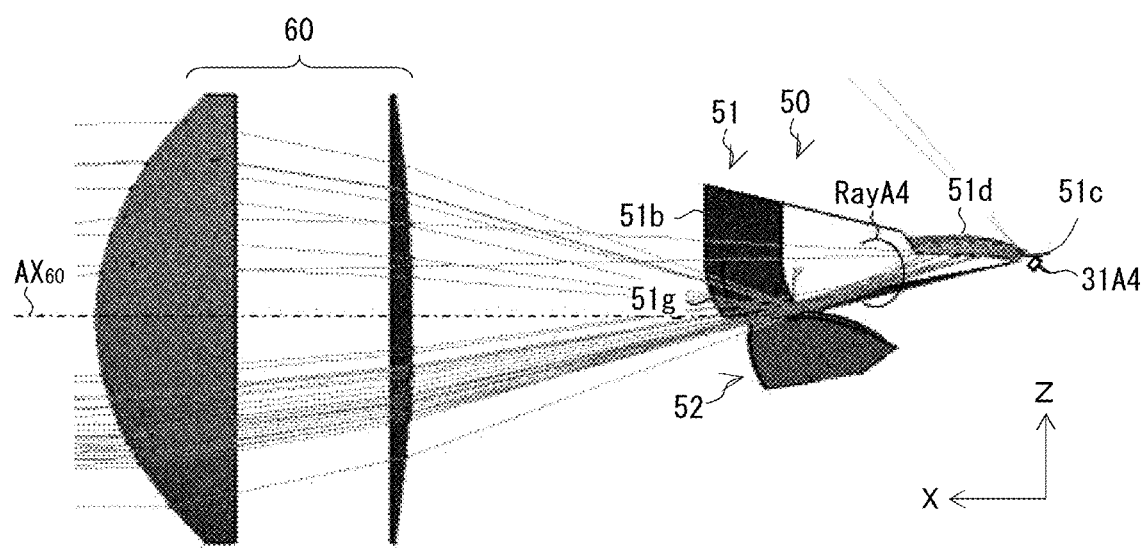
FIG. 7B is a side view showing the optical path of the light Ray $A_4$ emitted by the low beam light source $31A_4$.

As shown in FIG. 3, in a side view (also in a vertical section), the low beam light exiting surface 51b extends upward from a lower end portion of the low beam light exiting surface 51b through an inclined portion 51g inclined toward the front of the vehicle. As a result, as shown in FIG. 7B, the incident angle of light (For example, see Ray $A_4$ in FIG. 7B) incident on the vicinity of the lower end portion (inclined portion 51 g) of the low beam light exiting surface 51b is reduced. Thus, the occurrence of Fresnel reflection (Fresnel loss) or total reflection in the vicinity of the lower end portion (the inclined portion 51 g) of the low beam light exiting surface 51b is suppressed. Therefore, light can be efficiently extracted even in the vicinity of the lower end portion (the inclined portion 51 g) of the low beam light exiting surface 51b. FIG. 7B is a side view showing the optical path of the light Ray $A_4$ emitted by the low beam light source $31A_4$. It is preferable that the low beam light exiting surface 51b be disposed slightly rearward of the vehicle with respect to the focal point $F_{60}$ of the projection lens 60. In this manner, it is possible to prevent dust and the like adhering to the vicinity of the cut-off shape 51g from being projected onto the low beam light distribution pattern.

As shown in FIG. 3, a lower surface 51e is provided between the lower end of the low beam light exiting surface 51b and the low beam light incident surface 51c. An upper surface 51f is provided between the upper end of the low beam light exiting surface 51b and the low beam total reflection surface 51d.

Figure 8A:
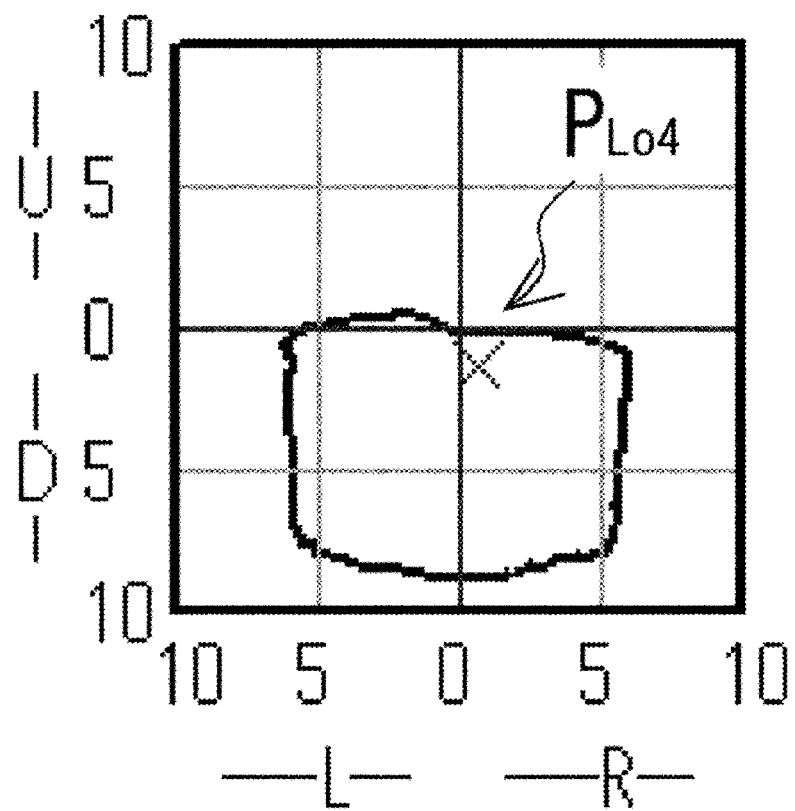
FIG. 8A shows an example of a partial light distribution pattern $P_{Lo4}$ for low beams formed by light Ray $A_4$ emitted by the low beam light source $31A_4$.
Figure 8B:
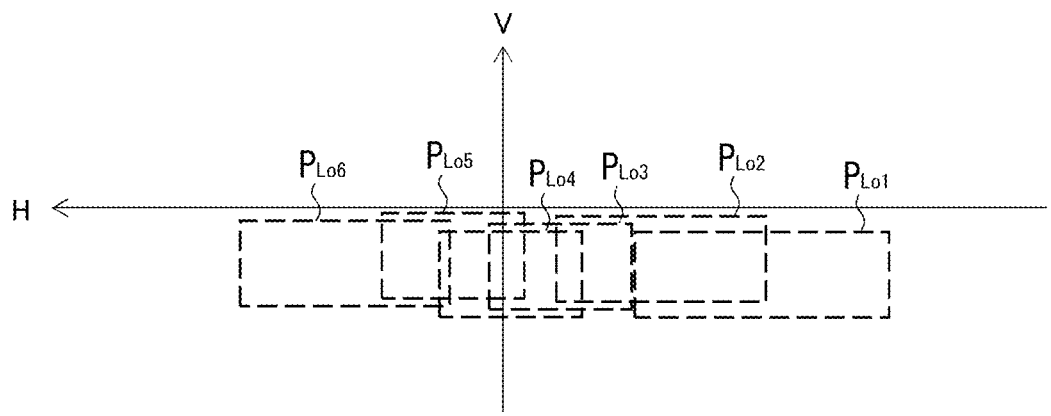
FIG. 8B shows an example of partial light distribution patterns $P_{Lo1}$ to $P_{Lo6}$ for low beams formed by light emitted by the low beam light sources $31A_1$~$31A_6$.
Figure 8C:
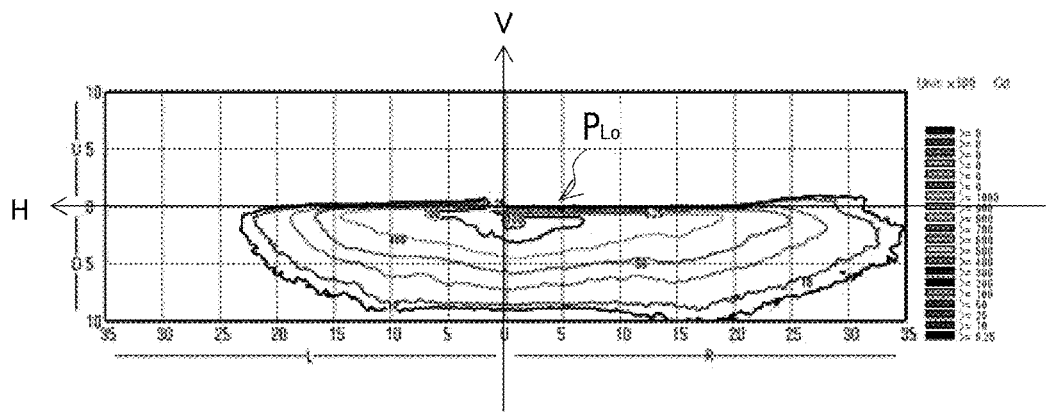
FIG. 8C shows an example of a low beam light distribution pattern $P_{LO}$ formed by overlapping partial light distribution patterns $P_{Lo1}$ to $P_{Lo6}$.

FIG. 8A shows an example of a partial light distribution pattern $P_{Lo4}$ for low beams formed by light Ray $A_4$ emitted by the light source $31A_4$ for low beams. The outer shape of partial light distribution pattern $P_{Lo4}$ in FIG. 8A is an isophotometric line (representing 625 cd). FIG. 8B shows an example of partial light distribution patterns $P_{Lo1}$ to $P_{Lo6}$ for low beams formed by light emitted by the light source $31A_1$~$31A_6$ for low beams. In practice, the upper and lower edges of the partial light distribution patterns $P_{Lo1}$ to $P_{Lo6}$ generally coincide. However, in FIG. 8B, the partial light distribution patterns $P_{Lo1}$ to $P_{Lo6}$ are depicted in a vertically shifted state because it is difficult to understand when they are depicted in a coincident state. FIG. 8C shows an example of a low beam light distribution pattern $P_{LO}$ formed by overlapping partial light distribution patterns $P_{Lo1}$ to $P_{Lo6}$. Each of the light distribution patterns shown in FIGS. 8A to 8C is formed on a virtual vertical screen (disposed about 25 m in front of the front surface of the vehicle) directly facing the front surface of the vehicle.

The low beam light distribution pattern $P_{LO}$ shown in FIG. 8C is formed as follows.

First, the low beam light source $31A_1$~$31A_6$ is turned on. For example, the light Ray $A_4$ (See FIGS. 7A and 7B) emitted by the low beam light source $31A_4$ enters from the low beam light incident surface 51c facing the low beam light source $31A_4$, is totally reflected by the low beam total reflection surface 51d, and exits from the low beam light exiting surface 51b.
As a result, a luminous intensity distribution corresponding to the partial light distribution pattern $P_{Lo4}$ shown in FIG. 8A is formed in the vicinity of the focal plane FP of the projection lens 60.

The luminous intensity distribution corresponding to the partial light distribution pattern $P_{Lo4}$ is inversely projected forward by the projection lens 60, thereby forming the partial light distribution pattern $P_{Lo4}$ as shown in FIG. 8A.

Similarly, light emitted by the low beam light sources $31A_1$ to $31A_3$, $31A_5$, and $31A_6$ other than the low beam light source $31A_4$ also enters from the low beam light incident surface 51c facing each respective low beam light source $31A_1$ to $31A_3$, $31A_5$, and $31A_6$, is totally reflected by the low beam total reflection surface 51d, and exits from the low beam light exiting surface 51b. As a result, a luminous intensity distribution corresponding to the partial light distribution pattern $P_{Lo1}$ to $P_{Lo6}$ shown in FIG. 8B is formed in the vicinity of the focal plane FP of the projection lens 60.

As described above, the luminous intensity distribution corresponding to the partial light distribution pattern $P_{Lo1}$ to $P_{Lo6}$ (see FIG. 8 B) formed in the vicinity of the focal plane FP of the projection lens 60 is inversely projected forward by the projection lens 60, thereby forming the low beam light distribution pattern $P_{LO}$ as shown in FIG. 8C. The upper edge of the low beam light distribution pattern $P_{Lo}$ includes a cut-off line corresponding to a cut-off shape 51g (see FIG. 5) provided between the lower end of the low beam light exiting surface 51b of the upper separator 51 and the upper end of the high beam light exiting surface 52b of the lower separator 52.

The partial light distribution pattern for low beams (For example, see $P_{Lo4}$ shown in FIG. 8A) is wider in the horizontal direction than the partial light distribution pattern for high beams (For example, see $P_{Hi7}$ shown in FIG. 12A.) described later, and is suitable for the light distribution pattern for low beams. This is because the optical length of the upper separator 51 (the optical distance at which the light from the low beam light source 31A passes through the upper separator 51) is longer than the optical length of the lower separator 52 (the optical distance at which the light from the high beam light source 31B passes through the lower separator 52) (see FIG. 3).

Furthermore, the partial light distribution patterns $P_{Lo1}$ to $P_{Lo6}$ for low beams are formed in a state where they overlap horizontally with each other (refer to FIG. 8B). Therefore, it is possible to create a low beam light distribution pattern $P_{Lo}$ that spreads horizontally without unevenness using fewer low beam light sources 31A.

Next, the lower separator 52 will be described.

The lower separator 52 includes a high beam light incident portion 52a ($52a_1$~$52a_{13}$. See FIGS. 3 and 6) disposed on the rear side of the vehicle and a high beam light exiting surface 52b disposed on the front side of the vehicle.

Hereinafter, when the high beam light incident portion $52a_1$~$52a_{13}$ is not particularly distinguished, it will be referred to as the high beam light incident portion 52a.

As shown in FIG. 6, a portion of the lower separator 52 on the rear side of the vehicle is divided by a plurality of dividing grooves 52j passing through in the Z-axis direction to form a strip-like high beam light incident portion $52a_1$~$52a_{13}$.

Figure 9:
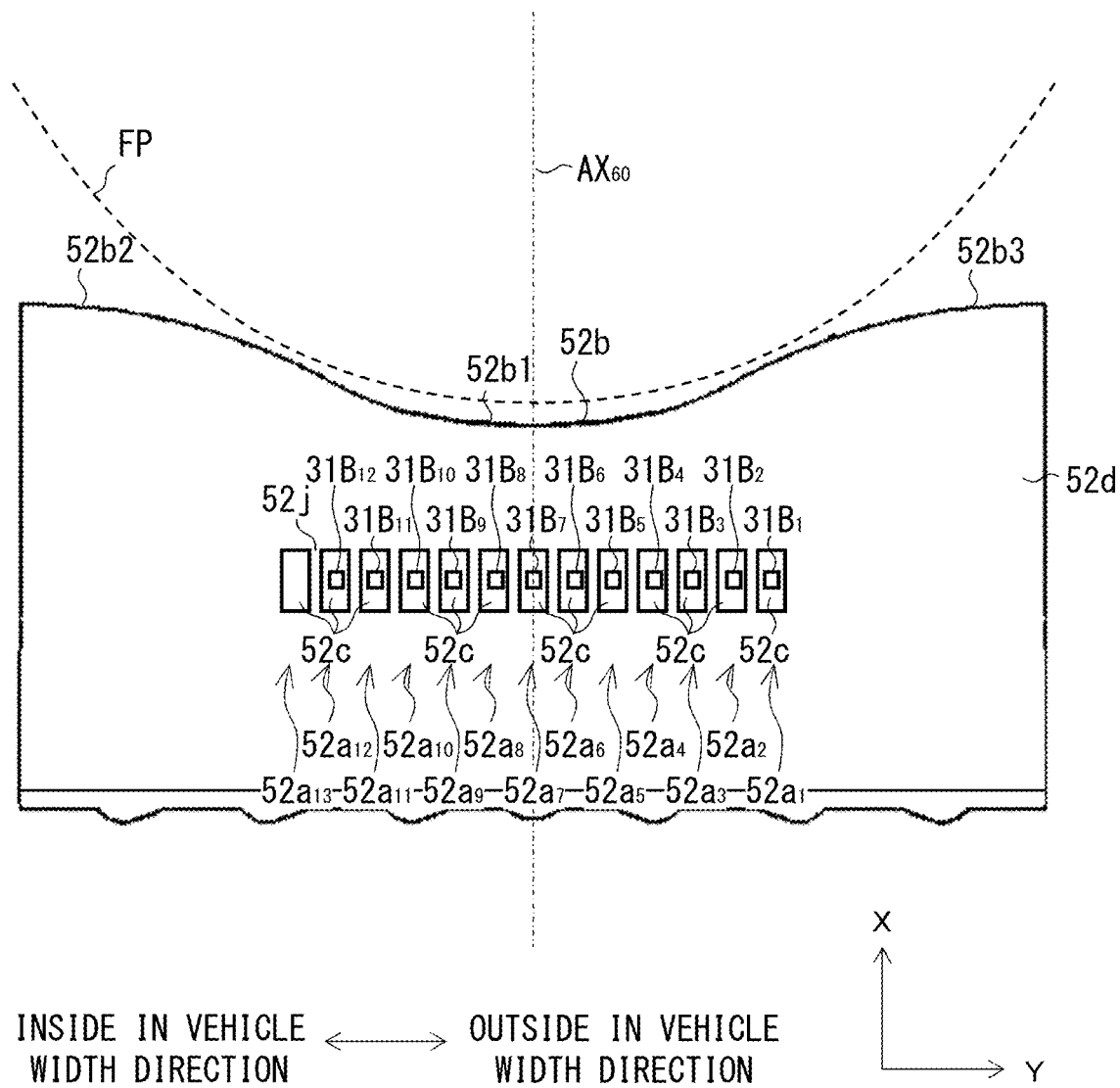
FIG. 9 is a bottom view of the separator 50.

FIG. 9 is a bottom view of the separator 50.

The high beam light incident portions $52a_1$~$52a_{13}$ are disposed in a line in the Y-axis direction. In the vehicle lamp 10 mounted on the right side of the front end of the vehicle (the right side toward the front of the vehicle) as in this embodiment, as shown in FIG. 9, the high beam light sources $31B_1$ to $31B_{12}$ are disposed in a state where the high beam light incident portions $52a_1$ to $52a_{12}$ face them.

On the other hand, although not shown, in the vehicle lamp 10 mounted on the left side of the front end of the vehicle (the left side toward the front of the vehicle), the high beam light sources $31B_1$ to $31B_{12}$ are disposed in a state where they face the high beam light incident portions $52a_2$ to $52a_{13}$ instead of $52a_1$ to $52a_{12}$.

As described above, the number of the high beam light entering portions $52a_1$~$52a_{13}$ is larger than the number of the high beam light sources $31B_1$~$31B_{12}$, and the separator 50 is configured symmetrically with respect to the optical axis AX60 of the projection lens 60 in the top view (see FIG. 4). Thus, the separator 50 (lower separator 52) can be used as both the vehicle lamp 10 mounted on the right side of the front end portion of the vehicle (on the right side toward the front of the vehicle) and the vehicle lamp 10 mounted on the left side of the front end portion of the vehicle (on the left side toward the front of the vehicle).

Figure 10:
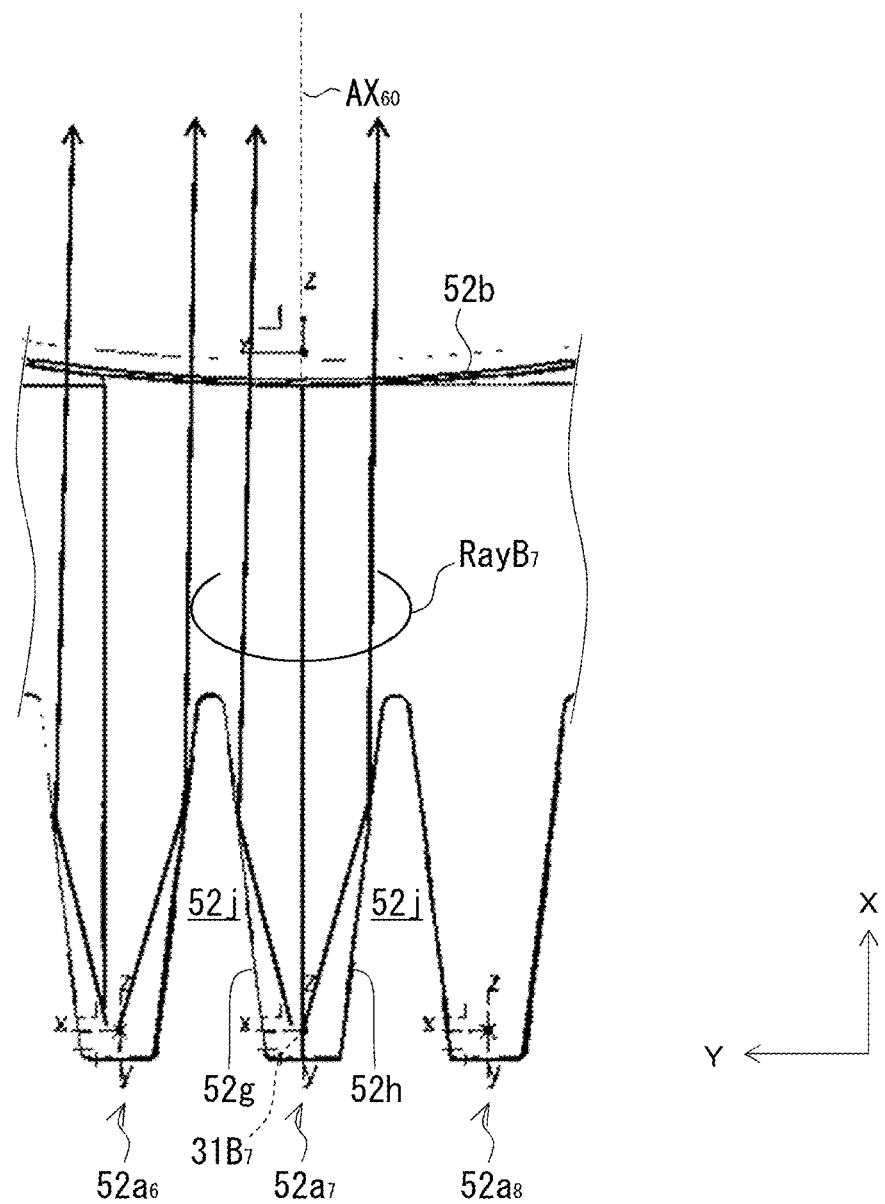
FIG. 10 is an enlarged view of the vicinity of the high beam light incident portion $52a_7$.

As shown in FIG. 3, the high beam light incident portion 52a includes a high beam light incident surface 52c facing the high beam light source 31B (light emitting surface) and a high beam total reflection surface 52d disposed above the high beam light incident surface 52c. Further, as shown in FIG. 10, the high beam light incident portion 52a includes a pair of side surfaces 52g and 52h. FIG. 10 is an enlarged view of the vicinity of the high beam light incident portion 52a7.

The high beam light incident surface 52c is, for example, a plane parallel to the light emitting surface of the high beam light source 31B. The distance between the high beam light source 31B (light emitting surface) and the high beam light incident surface 52c is about 2 mm. The high beam light source 31B is disposed close to the high beam light incident surface 52c.

The high beam total reflection surface 52d is a total reflection surface that totally reflects light from the high beam light source 31B that enters from the high beam light incident surface 52c and enters the high beam total reflection surface 52d so as to converge near the focal point $F_{60}$ of the projection lens 60. In this embodiment, the total reflection surface 52d for high beam is a reflection surface having a curved surface shape. The high beam total reflection surface 52d may be an elliptical total reflection surface having a first focal point located near the high beam light source 31B and a second focal point located near the focal point $F_{60}$ of the projection lens 60.

Figure 11A:
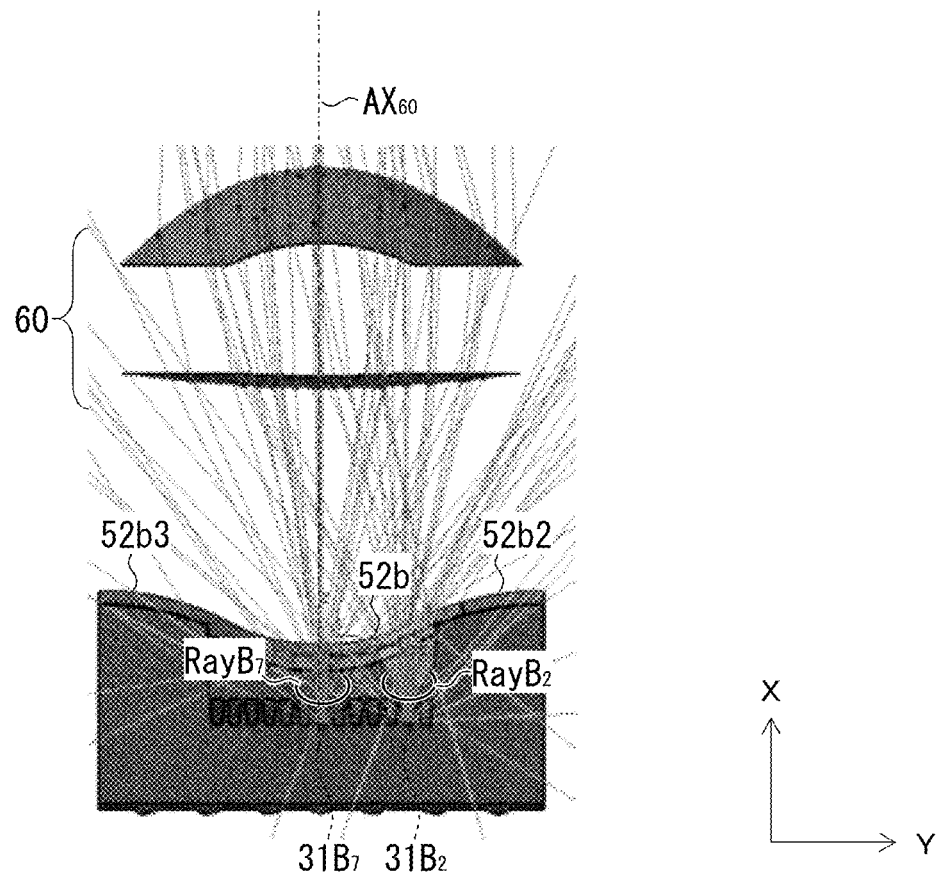
FIG. 11A is a bottom view showing the optical paths of the light Ray $B_7$ emitted by the high beam light source $31B_7$ and the light Ray $B_2$ emitted by the high beam light source $31B_2$.

As shown in FIG. 9, in the top view (also in the horizontal section), the central portion $52b_1$ of the high beam light exiting surface 52b is along the focal plane FP of the projection lens 60. On the other hand, portions $52b_2$ and $52b_3$ on both sides of the central portion $52b_1$ of the high beam light exiting surface 52b are separated from the focal plane FP of the projection lens 60 toward the rear side of the vehicle. As a result, the angle of incidence of light entering the portions $52b_2$ and $52b_3$ on both sides of the central portion $52b_1$ of the high beam light exiting surface $52b$ becomes smaller. Thus, the occurrence of Fresnel reflection (Fresnel loss) or total reflection is suppressed in the portions $51b_2$ and $51b_3$ on both sides of the central portion $51b_1$ of the low beam light exiting surface $51b$. Therefore, light can be efficiently extracted also in the portions $51b_2$ and $51b_3$ on both sides of the central portion $51b_1$ of the low beam light exiting surface $51b$. FIG. 11A is a bottom view showing the optical paths of the light Ray $B_7$ emitted by the high beam light source $31B_7$ and the light Ray $B_2$ emitted by the high beam light source $31B_2$.

Figure 11B:
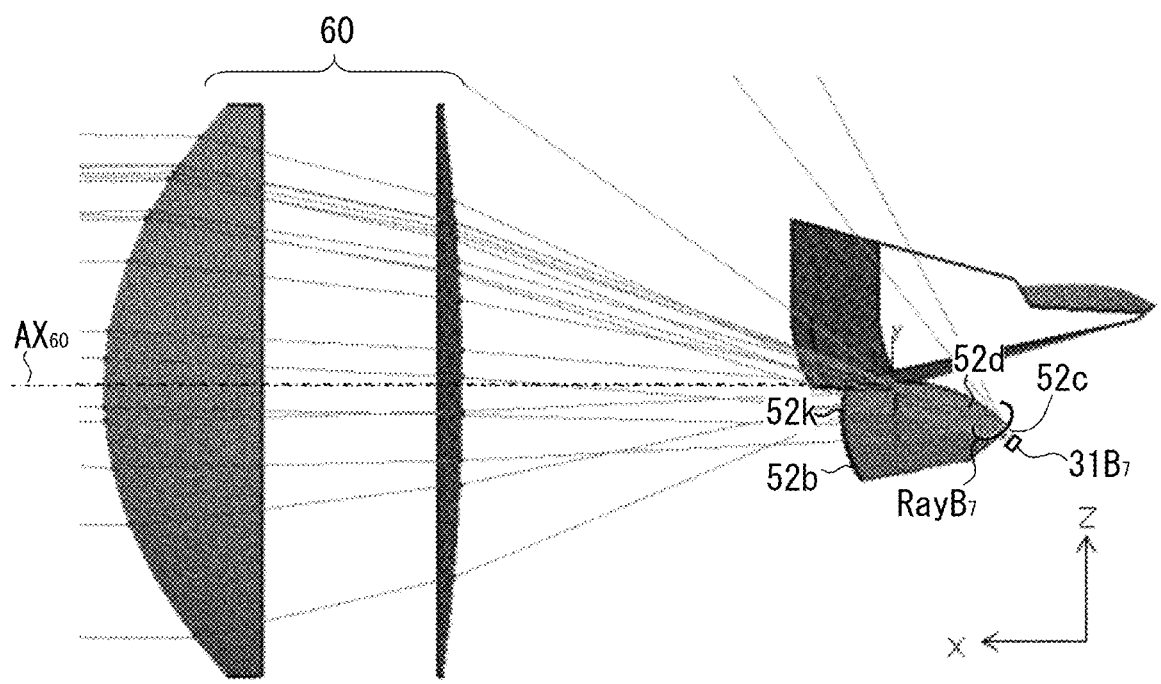
FIG. 11B is a side view showing the optical path of the light Ray $B_7$ emitted by the high beam light source $31B_7$.

As shown in FIG. 3, in a side view (also in a vertical section), the high beam light exiting surface $52b$ extends downward from a upper end portion of the high beam light exiting surface $52b$ through an inclined portion $52k$ inclined toward the front of the vehicle. As a result, the incident angle of light (For example, see Ray $B_7$ in FIG. 11B) incident on the vicinity of the upper end portion (inclined portion $52k$) of the high beam light exiting surface $52b$ is reduced. Thus, the occurrence of Fresnel reflection (Fresnel loss) or total reflection in the vicinity of the upper end portion (the inclined portion $52k$) of the high beam light exiting surface $52b$ is suppressed. Therefore, light can be efficiently extracted even in the vicinity of the upper end portion (the inclined portion $52k$) of the high beam light exiting surface $52b$. FIG. 11B is a side view showing the optical path of the light Ray $B_7$ emitted by the high beam light source $31B_7$. It is preferable that the high beam light exiting surface $52b$ be disposed slightly rearward of the vehicle with respect to the focal point $F_{60}$ of the projection lens 60. In this manner, it is possible to prevent dust and the like adhering to the vicinity of the cut-off shape $51g$ from being projected onto the high beam light distribution pattern.

As shown in FIG. 3, a lower surface $52e$ is provided between the lower end of the high beam light exiting surface $52b$ and the high beam light incident surface $52c$. An upper surface $52f$ is provided between the upper end of the high beam light exiting surface $52b$ and the high beam total reflection surface $52d$.

Figure 12A:
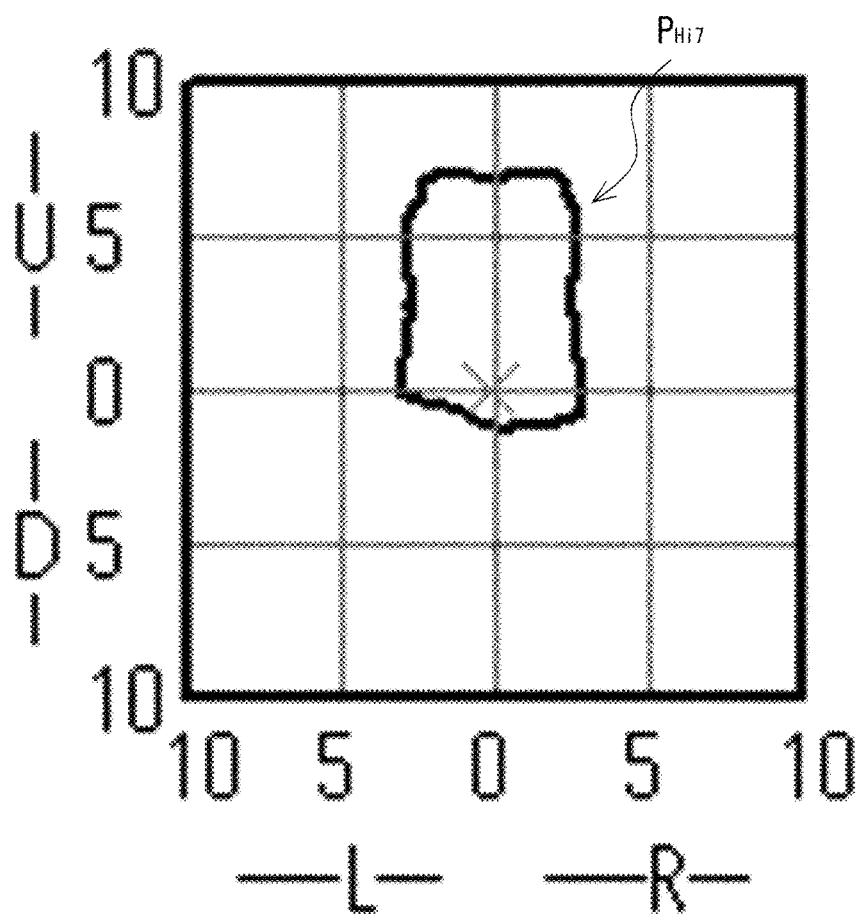
FIG. 12A shows an example of a partial light distribution pattern $P_{Hi7}$ formed by light Ray $B_7$ emitted by the high beam light source $31B_7$.

FIG. 12A shows an example of a partial light distribution pattern $P_{Hi7}$ formed by light Ray $B_7$ emitted by the for high beam light source $31B_7$.

Figure 12B:
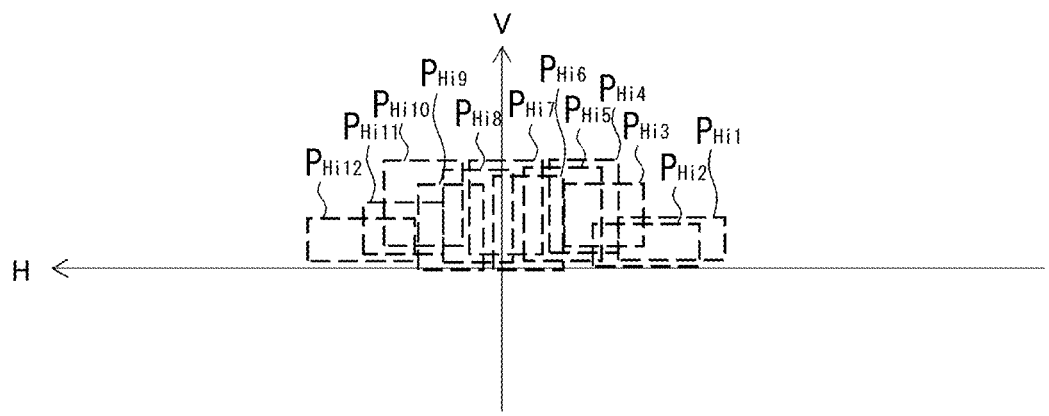
FIG. 12B shows an example of partial light distribution patterns $P_{Hi1}$ to $P_{Hi12}$ formed by light emitted by the light source $31B_1$~$31B_{12}$ for high beams.
Figure 12C:
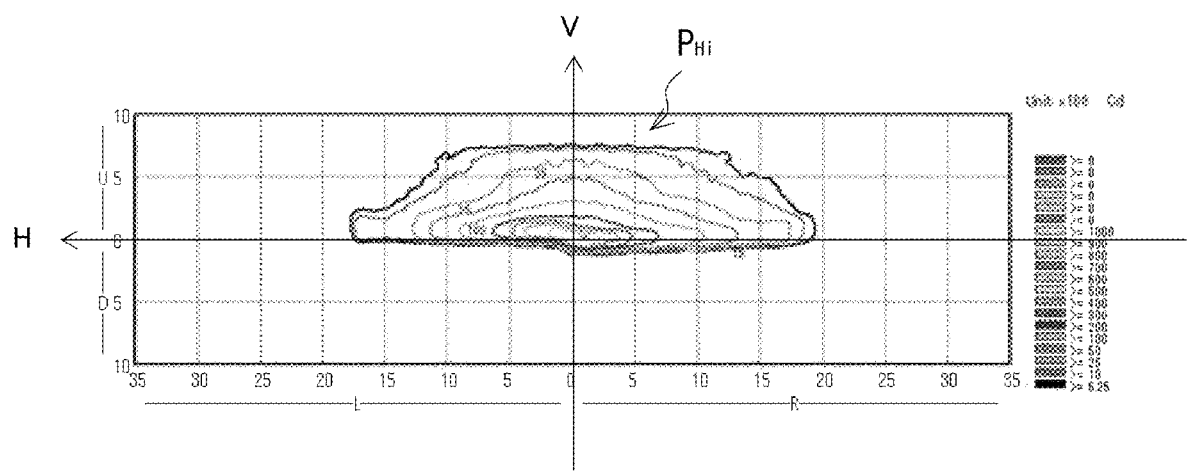
FIG. 12C shows an example of a high beam light distribution pattern $P_{Hi}$ formed by overlapping partial light distribution patterns $P_{Hi1}$ to $P_{Hi12}$.

The outer shape of partial light distribution pattern $P_{Hi7}$ in FIG. 12A is an isophotometric line (representing $625\ cd$). FIG. 12B shows an example of partial light distribution patterns $P_{Hi1}$ to $P_{Hi12}$ formed by light emitted by the light source $31B_1$~$31B_{12}$ for high beams. In practice, the lower edges of the partial light distribution patterns $P_{Hi1}$ to $P_{Hi12}$ generally coincide. However, in FIG. 12B, the partial light distribution patterns $P_{Hi1}$ to $P_{Hi12}$ are depicted in a vertically shifted state because it is difficult to understand when they are depicted in a coincident state. FIG. 12C shows an example of a high beam light distribution pattern $P_{Hi}$ formed by overlapping partial light distribution patterns $P_{Hi1}$ to $P_{Hi12}$. Each of the light distribution patterns shown in FIGS. 12A to 12C is formed on a virtual vertical screen (disposed about 25 m in front of the front surface of the vehicle) directly facing the front surface of the vehicle.

The high beam light distribution pattern $P_{Hi}$ shown in FIG. 12C is formed as follows.

First, the high beam light source $31B_1$~$31B_{12}$ is turned on. For example, the light Ray $B_7$ emitted by the high beam light source $31B_7$ (refer to FIGS. 11A and 11B) enters from the high beam light incident surface $52c$ facing the high beam light source $31B_7$. Part of the light is totally reflected by the high beam total reflection surface $52d$, and the other part of the light is totally reflected by the pair of side surfaces $52g$ and $52h$ (see FIG. 10), and exits from the high beam light exiting surface $52b$. Additionally, some light exits directly from the high beam light exiting surface $52b$ without being totally reflected by the high beam total reflection surface $52d$ or the pair of side surfaces $52g$ and $52h$. As a result, a luminous intensity distribution corresponding to the partial light distribution pattern $P_{Hi7}$ shown in FIG. 12A is formed in the vicinity of the focal plane FP of the projection lens 60.

The luminous intensity distribution corresponding to the partial light distribution pattern $P_{Hi7}$ is inversely projected forward by the projection lens 60, thereby forming the partial light distribution pattern $P_{Hi7}$ as shown in FIG. 12A.

Similarly, the light emitted by the high beam light sources $31B_1$~$31B_6$ and $31B8$~$31B_{12}$ other than the high beam light source $31B_7$ also enters from the high beam light incident surface $52c$ facing the high beam light sources $31B_1$~$31B_6$ and $31B8$~$31B_{12}$. Part of the light is totally reflected by the high beam total reflection surface $52d$, and the other part of the light is totally reflected by the pair of side surfaces $52g$ and $52h$ (see FIG. 10), and exits from the high beam light exiting surface $52b$. Additionally, some light exits directly from the high beam light exiting surface $52b$ without being totally reflected by the high beam total reflection surface $52d$ or the pair of side surfaces $52g$ and $52h$. As a result, a luminous intensity distribution corresponding to the partial light distribution pattern $P_{Hi1}$ to $P_{Hi12}$ shown in FIG. 12B is formed in the vicinity of the focal plane FP of the projection lens 60.

The luminous intensity distribution corresponding to the partial light distribution pattern $P_{Hi1}$ to $P_{Hi12}$ is inversely projected forward by the projection lens 60, thereby forming the partial light distribution pattern $P_{Hi}$ as shown in FIG. 12C. The lower edge of the high beam light distribution pattern $P_{Hi}$ includes a cut-off line corresponding to a cut-off shape $51g$ (see FIG. 5) provided between the lower end of the low beam light exiting surface $51b$ of the upper separator 51 and the upper end of the high beam light exiting surface $52b$ of the lower separator 52.

The partial light distribution pattern for high beams (For example, see $P_{Hi7}$ shown in FIG. 12A) is narrower in the horizontal direction than the partial light distribution pattern for low beams (For example, see $P_{Lo4}$ shown in FIG. 8A.) described above, and is suitable for the light distribution pattern for ADB (adaptive driving beam system). This is because the optical length of the upper separator 51 (the optical distance at which the light from the low beam light source 31A passes through the upper separator 51) is longer than the optical length of the lower separator 52 (the optical distance at which the light from the high beam light source 31B passes through the lower separator 52) (see FIG. 3).

Further, the high beam partial light distribution patterns $P_{Hi1}$ to $P_{Hi12}$ (see FIG. 12B) are brighter than the low beam partial light distribution patterns $P_{Lo1}$ to $P_{Lo6}$ (see FIG. 8B). This is because the lower separator 52 is provided with a strip-like high beam light incident portion $52a$ (pair of sides $52g$, $52h$) for controlling light not to diffuse in the horizontal direction.

As described above, according to the present embodiment, even if the number of light sources for low beam is reduced, it is possible to provide a vehicle lamp capable of suppressing the occurrence of light distribution unevenness in the light distribution pattern for low beam and preventing the partial light distribution pattern for high beam from expanding in the horizontal direction. As a result, it is possible to satisfy the luminosity required for the partial light distribution pattern for high beam and to realize the ADB function. This is because the optical length of the upper separator 51 is longer than that of the lower separator 52. That is, according to the present embodiment, by making the optical length of the upper separator 51 longer than that of the lower separator 52, the partial light distribution patterns $P_{Lo1}$ to $P_{Lo6}$ for low beams can be expanded in the horizontal direction and the regions overlapping each other can be increased. Therefore, even if the number of light sources for low beams is reduced, the occurrence of light distribution unevenness in the light distribution patterns for low beams can be suppressed. Further, according to the present embodiment, since the optical length of the upper separator 51 can be increased without increasing the optical length of the lower separator 52, even if the optical length of the upper separator 51 is increased longer than that of the lower separator 52 as described above, the partial light distribution patterns $P_{Hi1}$ to $P_{Hi12}$ for high beams do not spread in the horizontal direction. As a result, even if the number of light sources for low beam is reduced, the luminous intensity required for the partial light distribution pattern for high beam can be satisfied and the ADB function can be realized.

According to the present embodiment, the reflection angle of the light from the low beam light source 31A totally reflected by the low beam total reflection surface 51$d$ is more acute than the reflection angle of the light from the high beam light source 31B totally reflected by the high beam total reflection surface 52$d$. Further, the amount of light totally reflected by the total reflection surface 51$d$ for low beams is larger than the amount of light totally reflected by the total reflection surface 52$d$ for high beams. Therefore, the optical length of the upper separator 51 (the optical distance at which the light from the low beam light source 31A passes through the upper separator 51) can be further increased.

Further, according to the present embodiment, by making the optical length of the upper separator 51 (the optical distance at which the light from the low beam light source 31A passes through the upper separator 51) longer than the optical length of the lower separator 52 (the optical distance at which the light from the high beam light source 31B passes through the lower separator 52), the low beam light source 31A and the high beam light source 31B can be disposed at a distance from each other compared with the Patent Document 1, thereby being thermally advantageous compared with the Patent Literature 1.

Next, a modification will be described.

The separator 50 may be molded with heat-resistant material for the low beam light incident portion 51$a$ and high beam light incident portion 52$a$, and with non-heat-resistant material (such as acrylic or polycarbonate) for other parts.

In the above embodiment, the substrate 30 has been described as being fixed (e.g., screwed) to the heat sink 20 (substrate fixing surface 20$a$) in a state inclined at an angle θ1 (=50°) with respect to the Z axis, but the angle θ1 is not limited to 50°. For example, the angle θ1 may be less than 50°. In this case, the number of low beam light sources 31A may be increased. For example, when the angle θ1 is set to 40°, 7 low beam light sources 31A may be used. The angle θ1 may be larger than 50°. Thus, the number of low beam light sources 31A can be further reduced.

Further, in the above embodiment, the description has been given of an example in which the low beam light incident surface 51$c$ and the high beam light incident surface 52$c$ are plane (substantially plane), but the description is not limited thereto. For example, in order to provide more directivity, the low beam light incident surface 51$c$ (and the high beam light incident surface 52$c$) may be a convex surface (or a concave surface) that is convex toward the low beam light source 31A (the high beam light source 31B).

Figure 13:
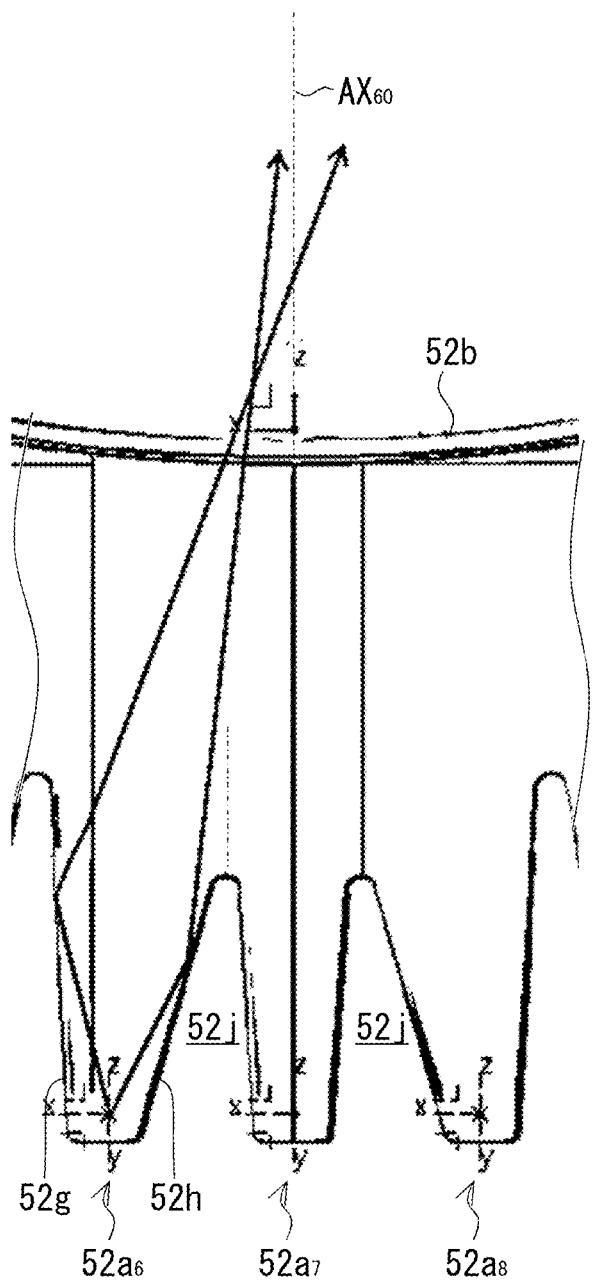
FIG. 13 is an enlarged view (modified example) of the vicinity of the high beam incident portion $52a_7$.

FIG. 13 is an enlarged view (modified example) of the vicinity of the high beam incident portion 52$a$7.

As shown in FIG. 13, the high beam light incident portion 52$a$ (e.g., high beam light inlets 52$a$6, 52$a$8) located on both sides of the centrally located high beam light inlet 52$a$7 may be disposed in an inclined state so that the light from the high beam light source 31B that is totally reflected by a pair of side surfaces 52$g$, 52$h$ is directed toward the optical axis AX60. In this way, the occurrence of Fresnel reflection (Fresnel loss) or total reflection on the high beam light exiting surface 52$b$ can be suppressed.

The numerical values described in the above-described embodiments are all illustrative, and appropriate numerical values different from the numerical values described in the above-described embodiments can be used as a matter of course.

The above-described embodiments are merely illustrative in all aspects. The present disclosure is not limitedly interpreted by the description of the above-described embodiments. The present disclosure can be implemented in other various forms without departing from the spirit or main features of the present disclosure.

This application is based on and claims the benefit of priority from Japanese Patent Application No. 2022-039348 filed on Mar. 14, 2022, the contents of which are hereby incorporated by reference.

REFERENCE SIGNS LIST

10 . . . Vehicle Lamp, 20 . . . Heat Sink, 20$a$ . . . Substrate fixing surface, 30 . . . Substrate, 30$a$ . . . Light Source Mounting Surface, 30$b$ . . . Back Surface, 31A (31A$_1$-31A$_6$) . . . Low Beam Light Source, 31B (31B$_1$-31B$_{12}$) . . . High Beam Light Sources, 40 . . . Holder, 41 . . . Light-Shielding Portion, 50 . . . Separator, 51 . . . Upper Separator, 51$a$ (51$a_1$~51$a_7$) . . . Low Beam Light Incident Portion, 51$c$ . . . Low Beam Light Incident Surface, 51$d$ . . . Low-Beam Total Reflection Surface, 51$e$ . . . Lower Surface, 51$f$ . . . Upper Surface, 51$g$ . . . Cut-Off Shape, 52 . . . Lower Separator, 52$a$ (52$a_1$~52$a_{13}$) . . . High Beam Light Incident Portion, 52$b$ . . . High beam light exiting surface, 52$c$ . . . High Beam Light Incident Surface, 52$d$ . . . High Beam Total Reflection Surface, 52$e$ . . . Lower Surface, 52$f$ . . . Upper surface, 52$g$, 52$h$ . . . Pair of Side Surfaces, 52$j$ . . . Dividing Grooves, 60 . . . Projection Lens, FP . . . Focal Plane

The invention claimed is:

1. A vehicle lamp, comprising:
a projection lens;
a plurality of low beam light sources located behind the projection lens;
a plurality of high beam light sources located behind the projection lens;
an upper separator made of a light-transmissive material, which is located behind the projection lens, and includes a plurality of low beam light incident portions into which light emitted from the plurality of low beam light sources is incident, and a low beam light exiting surface disposed on a vehicle front side; and
a lower separator made of a light-transmissive material, which is located behind the projection lens, and includes a plurality of high beam light incident portions into which light emitted from the plurality of high beam light sources is incident, and a high beam light exiting surface disposed on a vehicle front side; wherein the upper separator is disposed such that the low beam light exiting surface is located behind the projection lens and above the optical axis of the projection lens;

the lower separator is disposed such that the high beam light exiting surface is located behind the projection lens and below the optical axis of the projection lens;

each of the plurality of low beam light sources emits light which enters from a respective one of the plurality of low beam light incident portions, exits from the low beam light exiting surface, and is projected by the projection lens to form a plurality of partial light distribution patterns constituting a low beam light distribution pattern;

each of the plurality of high beam light sources emits light which enters from a respective one of the plurality of high beam light incident portions, exits from the high beam light exiting surface, and is projected by the projection lens to form a plurality of partial light distribution patterns constituting a high beam light distribution pattern;

a focal point of the projection lens is positioned between the low beam light exiting surface and the high beam light exiting surface;

the vehicle lamp further comprises a substrate on which the plurality of low beam light sources and the plurality of high beam light sources are mounted;

the plurality of low beam light incident portions are disposed on the rear side of the vehicle from the plurality of high beam light incident portions;

the substrate is disposed in an inclined state such that the plurality of low beam light sources face the plurality of low beam light incident portions, and the plurality of high beam light sources face the plurality of high beam light incident portions;

an optical length of the upper separator is longer than an optical length of the lower separator;

the plurality of high beam light incident portions include a pair of side surfaces that totally reflect a part of the light incident on the lower separator from each of the plurality of high beam light sources; and the lower separator is formed such that, among the plurality of partial light distribution patterns constituting the high beam light distribution pattern, the partial light distribution pattern that illuminates a central portion of a virtual vertical screen has a horizontal width narrower than the horizontal width of the partial light distribution pattern constituting the low-beam light distribution pattern that illuminates a position corresponding to this pattern.

2. The vehicle lamp according to claim 1, wherein each of the plurality of low beam light incident portions includes a low beam light incident surface and a low beam total reflection surface disposed above the low beam light incident surface, each of the plurality of high beam light incident portions includes a high beam light incident surface, a high beam total reflection surface disposed above the high beam light incident surface, and the pair of side surfaces, a cut-off shape corresponding to a cut-off line of the low beam light distribution pattern is provided between the low beam light exiting surface and the high beam light exiting surface.

3. The vehicle lamp according to claim 2, wherein the low beam total reflection surface is a total reflection surface for totally reflecting light from the low beam light source which enters from the low beam light incident portion and enters the low beam total reflection surface so as to converge in the vicinity of the focal point of the projection lens;

the high beam total reflection surface is a total reflection surface for totally reflecting light from the high beam light source which enters from the high beam light incident portion and enters the high beam total reflection surface so as to converge in the vicinity of the focal point of the projection lens.

4. The vehicle lamp according to claim 3, wherein the low beam total reflection surface is an elliptical total reflection surface having a first focal point located near the low beam light source and a second focal point located near the focal point of the projection lens;

the high beam total reflection surface is a curved total reflection surface.

5. The vehicle lamp according to claim 1, wherein in a vertical section, the low beam light exiting surface extends upward from a lower end portion of the low beam light exiting surface through an inclined portion inclined toward the front of the vehicle, and the high beam light exiting surface extends downward from an upper end portion of the high beam light exiting surface high beam through an inclined portion inclined toward the front of the vehicle.

6. The vehicle lamp according to claim 1, further comprising:

a light shielding member disposed between the upper separator and the lower separator.

7. The vehicle lamp according to claim 1 wherein the light-transmissive material is a silicone resin or glass.

8. The vehicle lamp according to claim 1, wherein the number of the plurality of low beam light incident portions is greater than the number of the plurality of low beam light sources.

9. The vehicle lamp according to claim 8, wherein the upper separator and the lower separator are integrally molded in a state where a part of the upper separator and a part of the lower separator are connected.

* * * * *